US009324093B2

(12) United States Patent
Setty et al.

(10) Patent No.: US 9,324,093 B2
(45) Date of Patent: Apr. 26, 2016

(54) MEASURING THE EFFECTS OF SOCIAL SHARING ON ONLINE CONTENT AND ADVERTISING

(75) Inventors: Vageesh Setty, Santa Clara, CA (US); Rampradeep Dodda, Santa Clara, CA (US); Prabhakar Goval, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 815 days.

(21) Appl. No.: 12/914,683

(22) Filed: Oct. 28, 2010

(65) Prior Publication Data

US 2012/0109737 A1 May 3, 2012

(51) Int. Cl.
*G06Q 30/00* (2012.01)
*G06Q 30/02* (2012.01)
*G06Q 50/00* (2012.01)

(52) U.S. Cl.
CPC ............ *G06Q 30/0242* (2013.01); *G06Q 50/01* (2013.01); *G06Q 30/0254* (2013.01); *G06Q 30/0263* (2013.01); *G06Q 30/0277* (2013.01)

(58) Field of Classification Search
CPC ... G06Q 50/01; G06Q 30/02; G06Q 30/0242; G06Q 30/0254; G06Q 30/0263; G06Q 30/0277
USPC .......... 705/14, 14.41, 14.52, 14.6, 14.73, 319
See application file for complete search history.

(56) References Cited

U.S. PATENT DOCUMENTS

| 7,092,821 | B2 * | 8/2006 | Mizrahi | A63F 13/10 702/1 |
| 7,613,979 | B1 * | 11/2009 | Marr | H03M 13/3761 370/401 |
| 7,774,229 | B1 * | 8/2010 | Dernehl et al. | 705/14.16 |
| 7,870,141 | B2 * | 1/2011 | Judge | G06F 17/2775 707/750 |
| 7,912,751 | B1 * | 3/2011 | Allos | 705/14.16 |
| 7,974,868 | B2 * | 7/2011 | Tseng | G06Q 10/0639 705/7.31 |
| 8,140,376 | B2 * | 3/2012 | Koonce | G06Q 30/02 705/7.29 |
| 8,180,680 | B2 * | 5/2012 | Leventhal | 705/26.1 |
| 8,234,152 | B2 * | 7/2012 | Jepson | G06Q 30/02 705/14.41 |
| 8,489,515 | B2 * | 7/2013 | Mathur | G06F 17/30867 705/319 |
| 8,599,801 | B2 * | 12/2013 | Baio | G06Q 30/02 370/312 |
| 8,700,618 | B2 * | 4/2014 | Evans et al. | 707/726 |

(Continued)

FOREIGN PATENT DOCUMENTS

WO  WO 01/23976 A2 *  5/2001

*Primary Examiner* — Bennett Sigmond
(74) *Attorney, Agent, or Firm* — Mauriel Kapouytian Woods LLP; Andrew A. Noble; James Woods

(57) ABSTRACT

A computer-implemented method, advertising network, and computer readable medium for measuring ad performance metrics after user-initiated sharing activity at a website. The method commences by receiving an original internet ad, the original internet ad for hosting within a website (e.g. a social networking website), then recoding the original internet ad (also for hosting within a website) wherein the recoded sharable internet ad comprises ad sharing and instrumentation code for capturing, tracking and later reporting various user-initiated sharing activities by measuring online events using the ad sharing and instrumentation code (i.e. the online events being in response to user-initiated sharing activity) without requiring any explicit action to be provided by the website operator. In some cases, the measured event occurs in the form of expanding an ad, clicking a request to share, printing a coupon, or performing an online conversion action. The ad can comprise any forms of internet media.

25 Claims, 12 Drawing Sheets

(56) References Cited

U.S. PATENT DOCUMENTS

| | | | |
|---|---|---|---|
| 8,862,663 B2* | 10/2014 | Pratt et al. | 709/204 |
| 2003/0227479 A1* | 12/2003 | Mizrahi | A63F 13/10 715/753 |
| 2004/0098370 A1* | 5/2004 | Garland | G06F 17/30106 |
| 2004/0193484 A1* | 9/2004 | Allen | G06Q 30/02 705/14.16 |
| 2005/0125287 A1* | 6/2005 | Sureka | G06Q 30/02 705/14.16 |
| 2005/0216338 A1* | 9/2005 | Tseng et al. | 705/14 |
| 2006/0224729 A1* | 10/2006 | Rowe et al. | 709/224 |
| 2007/0136657 A1* | 6/2007 | Blumenthal | G06F 17/241 715/201 |
| 2008/0010143 A1* | 1/2008 | Kniaz et al. | 705/14 |
| 2008/0134054 A1* | 6/2008 | Clark | G06F 17/30011 715/753 |
| 2008/0186926 A1* | 8/2008 | Baio et al. | 370/338 |
| 2008/0195466 A1* | 8/2008 | Wright | 705/14 |
| 2008/0255933 A1* | 10/2008 | Leventhal | G06Q 30/02 705/14.27 |
| 2008/0255934 A1* | 10/2008 | Leventhal | G06Q 30/02 705/14.16 |
| 2008/0256233 A1* | 10/2008 | Hall et al. | 709/224 |
| 2008/0313010 A1* | 12/2008 | Jepson | G06Q 30/02 705/7.32 |
| 2009/0006214 A1* | 1/2009 | Lerman | G06Q 30/0277 705/14.73 |
| 2009/0048922 A1* | 2/2009 | Morgenstern et al. | 705/14 |
| 2009/0076912 A1* | 3/2009 | Rajan et al. | 705/14 |
| 2009/0248633 A1* | 10/2009 | Ojakaar | G06Q 30/02 |
| 2009/0292608 A1* | 11/2009 | Polachek | 705/14.44 |
| 2009/0299862 A1* | 12/2009 | Fan et al. | 705/14.73 |
| 2010/0030638 A1* | 2/2010 | Davis, III | G06Q 30/02 705/14.43 |
| 2010/0268584 A1* | 10/2010 | Pullur | G06Q 30/02 705/14.16 |
| 2010/0318611 A1* | 12/2010 | Curtin et al. | 709/206 |
| 2011/0161423 A1* | 6/2011 | Pratt | G06Q 10/06 709/205 |
| 2011/0161990 A1* | 6/2011 | Smith et al. | 719/328 |
| 2011/0225540 A1* | 9/2011 | D'Entremont et al. | 715/786 |
| 2011/0251880 A1* | 10/2011 | Butler et al. | 705/14.13 |
| 2011/0320715 A1* | 12/2011 | Ickman et al. | 711/118 |
| 2012/0226521 A1* | 9/2012 | Bosworth | G06Q 50/01 705/7.32 |
| 2012/0226748 A1* | 9/2012 | Bosworth | H04L 12/1813 709/204 |
| 2014/0095509 A1* | 4/2014 | Patton | G06F 17/30241 707/740 |
| 2015/0088607 A1* | 3/2015 | Georgoff | G06Q 30/0246 705/7.31 |

\* cited by examiner

Start Advertising with Search Marketing in 6 Simple Steps

Please note that this signup process uses image verification technology to prevent abuse. Screen readers are not compatible with this technology. In an effort to serve as many Yahoo! customers as possible, we also offer phone registration. If you are using a screen reader, please call us at 1-800-123-4567 to register for a Search Marketing account. We look forward to partnering with you.

1. Tell Us About Your Products or Services
   Enter information about what you want to advertise.

Type the URLs to your webpages or catalog pages. For example: http://myProductPages.com/Product_A 2. Target Customers by Geographic Location
   Display your ad to customers throughout the entire market, or select specific regions or cities.

3. Choose Keywords Related to Your Business
   Enter words or phrases related to the products and services your business provides.

4. Tell Us How Much You'd Like to Spend
   Specify your daily spending limit and maximum bid.

5. Create Your Ad
   Write the ad that will be displayed to prospective customers.

6. Activate or Save Your Ad
   Review your ad and activate it by entering your billing information, or save it until you are ready to activate.

FIG. 2A

MEASURING THE EFFECTS OF SOCIAL SHARING ON ONLINE CONTENT AND ADVERTISING

FIELD OF THE INVENTION

The present invention is directed towards online advertising, and more particularly toward a methodology to track the effects of sharing on content and advertising within online social networks.

BACKGROUND OF THE INVENTION

The exploding popularity and sophistication of the internet has brought to bear easy access for anyone or any entity to publish, consume and aggregate content. Along with an explosion of content, the rate of appearance of advertisements that accompany content (which advertisements also serve to monetize the content) is growing at a similar pace. Internet advertising supports a large and sophisticated ecosystem of participants including publishers, content providers, ad networks, ad agencies, ad aggregators, ad arbitragers, and social networking website operators.

Some of the participants are more technologically savvy than others, and understand the inner workings of an ad network. In contrast, some of the participants have more marketing savvy than others, but do not necessarily understand the inner workings of ad placement. Highly effective internet advertising demands high performance from the network as well as high performance (e.g. high performance in the form of clicks or conversions) from the population to which the advertisement is targeted. However, in some situations, especially in the context of online social networking websites, the effectiveness of advertisements cannot be comprehended solely on the basis of legacy measurement techniques.

For this and other reasons, what is needed are techniques for measuring the effects of social sharing on online content and advertising.

SUMMARY OF THE INVENTION

In the context of online social networking websites, the effectiveness of advertisements can be measured for subsequent analysis based on capturing aspects of events resulting from user-initiated sharing activity at an internet website. User-initiated forms of "social sharing" can include any form of online viral marketing. In many cases, social sharing promotes content, which content can include video, news, product information, etc, even including social sharing of advertisements. Indeed, many marketers have started to incorporate sharing capabilities into their advertising campaigns and, similarly many online publishers promote social sharing by offering sharing tools within or alongside content on their website (e.g. an internet destination site, a social networking site, etc).

For both marketers and publishers alike, the challenge has been to figure out how to measure the effectiveness of sharing and ad. Specifically, both marketers and publishers want to measure the effect of user-initiated sharing activity (e.g. pre-sharing activity, actual user sharing of the ad, and post-sharing activity). Most social networks that enable sharing offer and promote application program interfaces (APIs) that allow third parties to share content or share advertising, possibly including sharing along with user comments or other user connotation messages (e.g. a thumbs-up, a thumbs-down, like, dislike, etc). However, these legacy APIs, regardless of sophistication, provide little or no means of tracking the effectiveness of this sharing. That is, such legacy APIs do not possess capabilities to track the full range of user-initiated activities. Without such a tracking capability, marketers and publishers are left in the dark as to the value that can be attributed to each sharing and any post-sharing activity.

Embodiments herein provide an easily deployable tracking and measurement capability (i.e. a tracking capability that instruments sharing behavior without requiring any explicit action or explicit data sharing, or explicit API capability, or other explicit support to be provided by the operator of the website), The techniques herein describe methodologies and techniques to track the effects of sharing on content and advertising using an online social network website (or any other website for that matter). In some situations, application of the techniques described herein can be used for measuring the effects of pre-sharing activities and of post-sharing activities, possibly for use in optimizing an advertising campaign.

The disclosure herein includes descriptions of methods as well as descriptions of apparatuses included in a networked system for online advertising. Some embodiments incorporate the social sharing component (e.g. a screen device, a widget, etc) within the authoring/publishing tools. Such authoring/publishing tools can be designed in a way that when a sharing component is included into an advertisement or into a publisher's page (e.g. at a publisher's website, or at a social networking website), the sharing component automatically instruments sharing behavior—without requiring any explicit action or explicit data sharing, or explicit API capability, or other explicit support to be provided by the operator of the website. In various embodiments, a sharing component automatically instruments pre-sharing activity as well as post-sharing activity. In some embodiments, a sharing component may automatically instrument sharing activity itself.

A method for automatically instrument sharing activity commences by receiving an original internet ad, the original internet ad for hosting within a social networking website, then recoding the original internet ad (also for hosting within a social networking website) wherein the recoded sharable internet ad comprises ad sharing and instrumentation code for capturing, tracking and later reporting user-initiated sharing activities by measuring online events using the ad sharing and instrumentation code (i.e. the online events being in response to user-initiated sharing activity)—and without requiring any explicit action to be provided by the operator of the website. In some cases, the measured event occurs in the form of expanding an ad, clicking a request to share, printing a coupon, or performing an online conversion action. The ad can comprises any of a video clip, a video clip with audio, and/or a video clip with user controls, etc.

BRIEF DESCRIPTION OF THE DRAWINGS

The novel features of the invention are set forth in the appended claims. However, for purpose of explanation, several embodiments of the invention are set forth in the following figures.

FIG. 2A depicts a screen device with a multi-step procedure for defining and managing variables within an advertising campaign, according to an exemplary embodiment.

DETAILED DESCRIPTION

Figure 1:
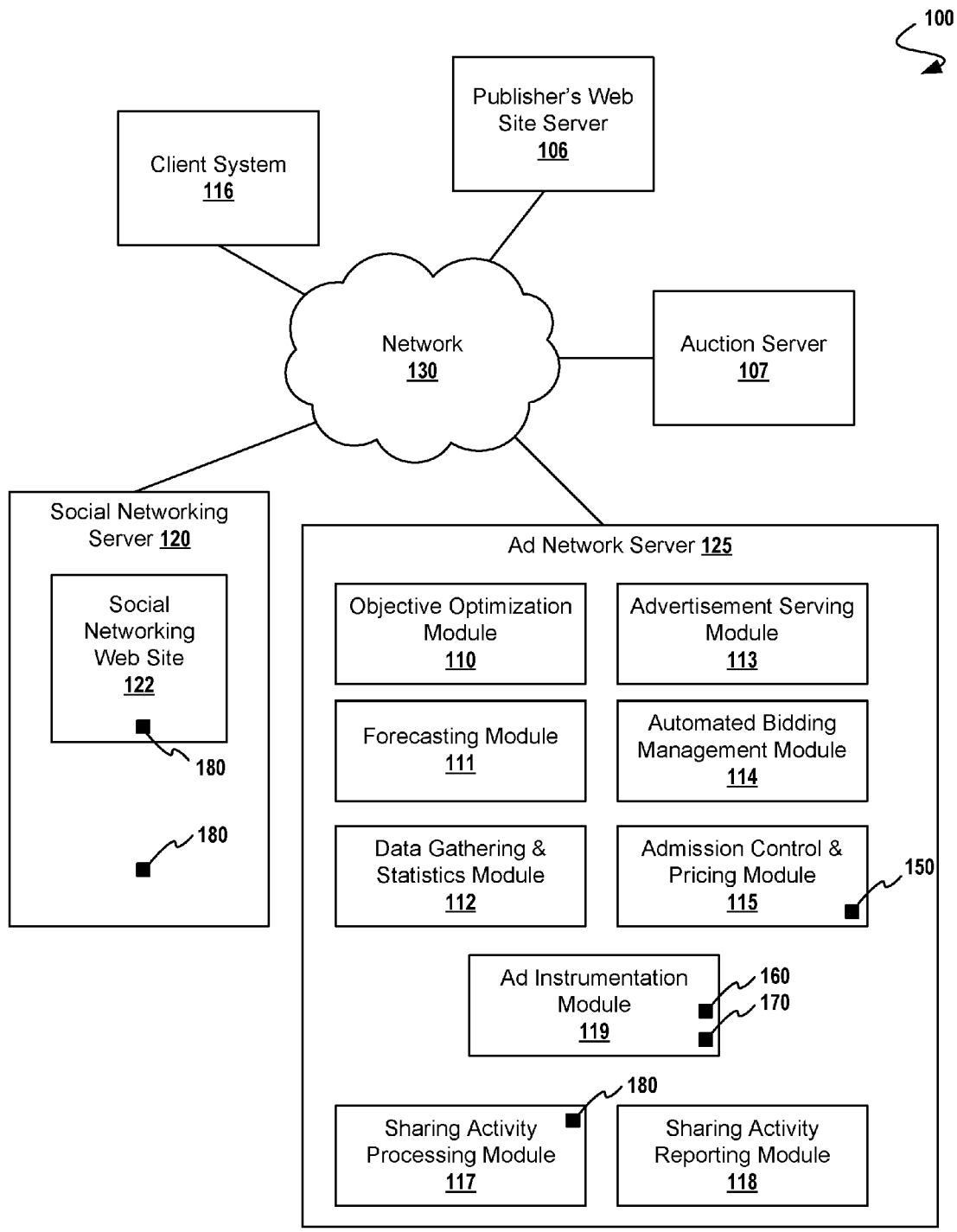
FIG. 1 depicts an advertising server network including modules for measuring the effects of social sharing on online content and advertising, in which some embodiments operate.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an item and/or a message.

"Ad call" means a message sent by a computer to an ad server for requesting an ad to be displayed.

"Ad click-through rate" (e.g. click-through rate) means a measurement of ad clicks per a period of time.

"Ad code" means the HTML or other markup language description that describes an advertisement or message in such a manner as can be parsed by a browser. Ad code may include references to other ad code. Ad code may mean any subset, or portion or segment of ad code that describes an advertisement or message in such a manner as can be parsed by a browser.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Coupon" (e.g. coupon ad) means a portion of a certificate, ticket, label, ad or the like—set off from the main body by dotted lines or the like to emphasize its separability—entitling the holder to something, such as a gift or discount, or for use as an order blank or a contest entry form, etc. A coupon is designed in a convenient format for a user to "take" the coupon to a seller to receive an advertised benefit.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Impression" (e.g. ad impression) means a delivery of an ad to a user device for viewing by a user.

"Item" means an ad, which is defined above.

"Marketplace" means a world of commercial activity where products and/or services are browsed, bought and/or sold, etc. A marketplace may be located over a network, such as the internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks including, without limitation, the internet, a local area network, a wide area network, a wireless network, and/or a cellular network.

"Publisher" means an entity that publishes, on a network, a web page having content and/or ads, etc.

"Server" means a software application that provides services to other computer programs (and their users) on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social network" or "social networking website" means a networked software application having user accounts (e.g. nodes) that are coupled by using one or more interdependencies such as, for example, friendship, kinship, common interest, financial exchange, dislike, sexual relationship, beliefs, knowledge and/or prestige. Examples of a social network include, without limitation, Facebook™, Twitter™, Myspace™, Delicious™, Digg™, and/or Stumble Upon™.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from web pages on websites. Examples of a web browser include, without limitation, Mozilla Firefox™ and Microsoft Internet Explorer™.

"Web page" means documents written in a mark-up language including, without limitation, HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected by links or URL addresses to form a coherent group.

Overview of Online Social Network Websites in Online Advertising

Use of online social networking has become a very common component of an internet user's online activity. Accordingly, measurement of various aspects of a user's behavior within the context of online social networking activities has become important to measuring the effectiveness of online marketing campaigns. Advertisers have long recognized that highly effective advertising campaigns often exhibit "pop culture" or "word of mouth" or other "social sharing" behaviors in advance of an ad or product "catching on" or "going viral".

In the context of online advertising, "social sharing" can include any form of online viral marketing. In many cases, social sharing promotes content, which content can include video, news, product information, etc, even including social sharing of advertisements. Indeed, many marketers have started to incorporate sharing capabilities into their advertising campaigns and, similarly many online publishers promote social sharing by offering sharing tools within or alongside content on their website (e.g. an internet destination site, a social networking site, etc).

For both marketers and publishers alike, the challenge has been to figure out how to measure the effectiveness of sharing an ad. Specifically, both marketers and publishers want to measure the effect of user-initiated sharing activity (e.g. pre-sharing activity, actual user sharing of the ad, and post-sharing activity). Most social networks that enable sharing offer and promote application program interfaces (APIs) that allow third parties to share content or share advertising, possibly including sharing along with user comments or other user connotation messages (e.g. a thumbs-up, a thumbs-down, like, dislike, etc).

However, these legacy APIs, regardless of sophistication, provide little or no means of tracking the effectiveness of this sharing. That is, such legacy APIs do not possess capabilities to track activities that occur post-sharing. Without a post-sharing tracking and measurement capability, the marketers and publishers are left in the dark as to the value that can be attributed to each sharing and any post-sharing activity. As a result, publishers and marketers cannot decide what types of content are most suitable for sharing, particularly as relating to the effectiveness of an advertisement to garner clicks and/or conversions. Nor can they determine which social networks provide the best value for advertising. Nor can they determine which users are the significant influencers within the viral path. This lack of measurement capability and any insight that derives from measurements related thereto makes it difficult for the marketers and publishers to optimize an advertising campaign that relies (wholly or in part) on social sharing activity.

The techniques herein describe methodologies and techniques to track the effects of sharing on content and advertising using an online social network website (or any other website for that matter). In some situations, application of the techniques described herein can be used for measuring the effects of pre-sharing activities and of post-sharing activities, possibly for use in optimizing an advertising campaign.

The disclosure herein includes descriptions of methods as well as descriptions of apparatuses included in a networked system for online advertising. Some embodiments incorporate the social sharing component (e.g. a screen device, a widget, etc) within the authoring/publishing tools. Such authoring/publishing tools can be designed in a way that when a sharing component is included into an advertisement or into a publisher's page (e.g. at a publisher's website, or at a social networking website), the sharing component automatically instruments sharing behavior—without requiring any explicit action or explicit data sharing, or explicit API capability, or other explicit support to be provided by the operator of the website. In various embodiments, a sharing component automatically instruments pre-sharing activity as well as post-sharing activity. In some embodiments, a sharing component may automatically instrument sharing activity itself.

Overview of Networked Systems for Online Advertising

FIG. 1 depicts an advertising server network including modules for measuring the effects of social sharing on online content and advertising.

In the context of internet advertising, placement of advertisements within an internet environment (e.g. online advertising system 100 of FIG. 1) has become common. As shown, network nodes are organized into a network such than an internet advertiser or agent may select a particular property (e.g. a website, a social networking website) and may create an advertisement such that whenever any internet user, via a client system 116, renders the web page from the selected property, possibly using a social networking server 120, and/or a publisher's website server 106, the advertisement is composited on the web page by one or more servers (e.g. the aforementioned servers and/or an ad network server 125) for delivery to a client system 116 over a network 130. Given this generalized delivery model, and using techniques disclosed herein, sophisticated online advertising might be practiced. Moreover the online advertising system 100 serves various needs of the participants in the internet ad ecosystem, including booking of contracts for internet advertising campaigns, measurement of social sharing of online advertising, and for management of a wide range of aspects of prosecuting such an internet advertising campaign.

Again referring to FIG. 1, an internet property (e.g. a social networkingwebsite 122 embodied in a social networking server 120) might be able to attract internet visitors, which visitors may have any arbitrary interest, demographic, target predicates, or other attributes. In fact, a social networking server 120, possibly in conjunction with a data gathering and statistics module 112, can capture details as pertains to user behavior. Thus, an internet user's behaviors, demographics and interests might be 'known' in quite some detail as pertains to a wide range of user queries, interest categories, or other demographics or attributes. Also, behaviors (e.g. the likelihood of a click or other measurable online event) might also be known in quite some detail, not only for a particular user, but also for a group of users corresponding to a particular slice of the available data. Such characteristics (i.e. one or more characteristics) and/or features can be used in the statistical modeling of users, even to the extent that a forecasting module 111, possibly in conjunction with a data gathering and statistics module 112, can forecast future supply accurately—or at least to a statistically known degree of accuracy. Thus, for a particular user, ads corresponding to the demographics of the particular user may be served as advertisements retrieved from an ad network server 125. In some situations, reaching a particular demographic is commercially competitive, so multiple advertisements retrieved from an ad network server 125, possibly in conjunction with a social networking server 120, may be auctioned (possibly using bidding at an auction server 107), which can be used to resolve such commercial competition.

In some embodiments, the online advertising system 100 might host a variety of modules to serve management and control operations (e.g. an objective optimization module 110, a forecasting module 111, a data gathering and statistics module 112, an advertisement serving module 113, an automated bidding management module 114, an admission control and pricing module 115, etc) pertinent to defining and managing ad campaigns and for serving advertisements to users. In particular, the modules, network links, algorithms, serving policies, and data structures embodied within the online advertising system 100 might be specialized so as to perform a particular function or group of functions reliably while observing capacity and performance requirements. For example, an admission control and pricing module 115 might serve for storing an original internet ad 150 in readiness for processing before the start of a corresponding campaign. As a further example, an ad instrumentation module 119, a sharing activity processing module 117, and/or a sharing activity reporting module 118 can operate partly in an offline (or batch) mode, and partly in a real-time (or interactive) online mode. As shown, and without regard to allocation of any particular operation to any particular mode, an ad instrumentation module 119 can accept an original internet ad 150 and recode it into one or more forms for producing a recoded sharable internet ad 160 using ad sharing and instrumentation code 170. Any one or more modules within an online advertising system 100 can operate cooperatively to implement a system for measuring the effects of social sharing on online content and advertising. Furthermore, an online event 180 can occur anywhere in the online advertising system 100, and actual measurement of an online event 180 may be carried out in any module (e.g. within the social networking server 120, within the social networking website 122, within the sharing activity processing module 117, etc).

As earlier indicated, sharing activities can include pre-sharing activities, the sharing activity itself, and post-sharing activities. In an exemplary embodiment involving rich media advertising authoring, a sharing component automatically instruments pre-sharing activity, the sharing activity itself, and automatically instruments post-sharing activity as well. These activated are shown and described in the figures and accompanying text below.

Measurement of Sharing-related Activity

Some embodiments incorporate sharing as a component within the ad authoring to make incorporating sharing (e.g. using a sharing component) as easy as selecting from a dropdown menu choice in the ad authoring tool. Such an ad authoring tool may be included in an overall campaign definition and management tool.

FIG. 2A depicts a screen device 2A00 with a multi-step procedure for defining and managing variables within an advertising campaign. As shown, the steps for defining variables within an ad campaign might include providing some initial information about the products or services to be advertised 2A10, establishing geographic coverage 2A20, defining keywords and bid phrases 2A30, defining advertising spend- and budget-oriented constraints 2A40, creating advertising copy and advertising imagery 2A50, and activating and/or saving the campaign 2A60 variables. In various embodiments, one or more of the steps 2A10-2A60 might be performed on the basis of user interaction from a client system 116 (see FIG. 1). In other embodiments, one or more of the steps 2A10-2A60 might be performed either fully automatically, or in a computer-aided manner by use of a content server. In an exemplary embodiment, the step providing some initial information about the products or services to be advertised 2A10 might include a screen device 2A15 for requesting a user to merely identify a web page that features the products or services to be advertised. Of course a wide range of information about the subject product or service might be retrieved from the identified web page(s), including information on geographic location, appropriate geographic scope, keywords, images and style for creative advertisement generation, and even budget-related constraints or variables.

Figure 2B:
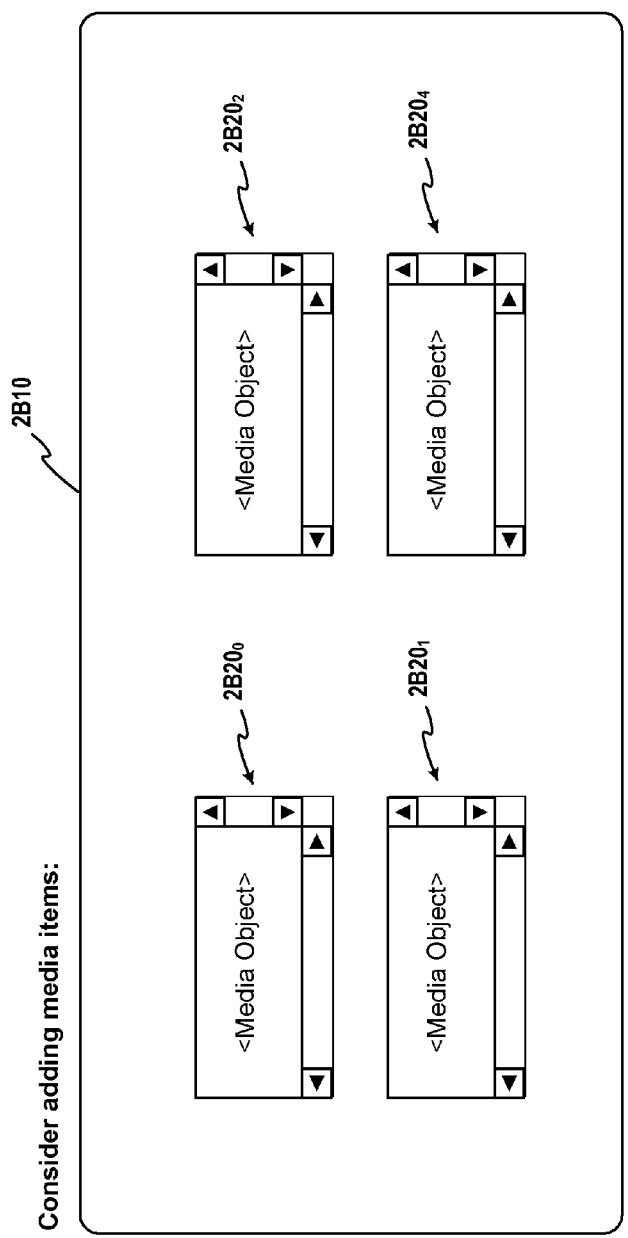
FIG. 2B depicts a screen device for a campaign variable set-up procedure for selecting media objects, according to an exemplary embodiment.

FIG. 2B depicts a screen device 2B00 for a campaign variable set-up procedure for selecting media objects. As shown, a view portal, namely rich media view portal 2B10 might be populated manually (e.g. via drag-and-drop) or other screen device, or it might be populated either fully automatically or in a computer-aided manner, possibly using data gathered from use of the screen devices of FIG. 2A. In particular, any media objects selected may be used in further operations, for example in operations for adding instrumentation pertinent to measuring the effects of social sharing on online content and advertising (discussed below). Further, an authoring tool might include an object viewer or multiple object viewers 2B20 and a control panel (not shown in FIG. 2B).

Figure 3:
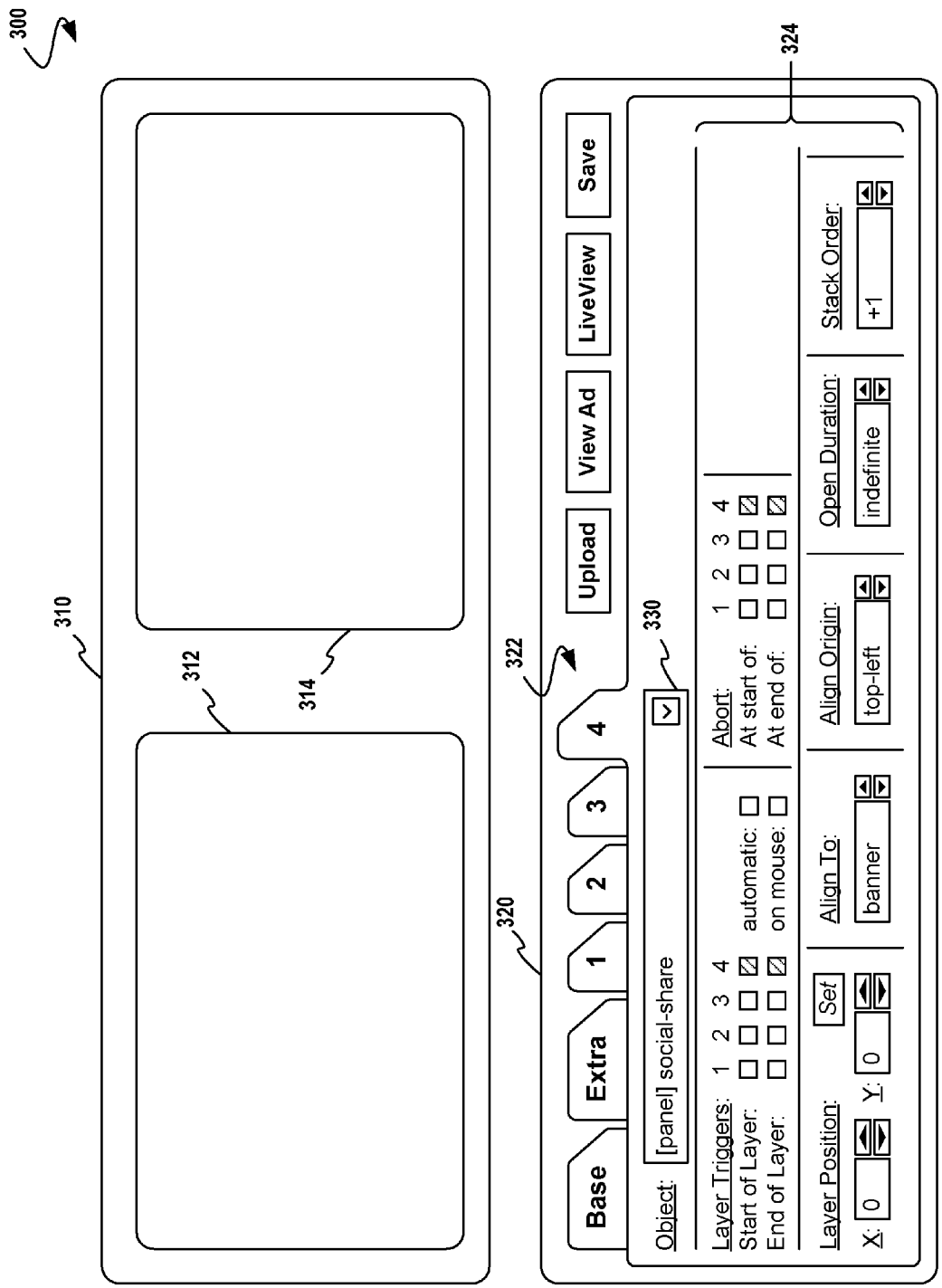
FIG. 3 depicts a screen device for adding instrumentation pertinent to measuring the effects of social sharing on online content and advertising.

FIG. 3 depicts a screen device for adding instrumentation pertinent to measuring the effects of social sharing on online content and advertising. Using such an object cockpit 300, an advertiser can incorporate the social sharing instrumentation component (e.g. using ad sharing and instrumentation code 170) while using the authoring/publishing tools. As shown, the object cockpit 300 is designed in a way that ad sharing and instrumentation code 170 can be automatically incorporated into an advertisement at the election of the advertiser (i.e. at the election by the user of the authoring/publishing tools).

Continuing the description of FIG. 3, the object cockpit 300 includes an object viewer 310, which includes a static object display viewport 312 and a live object display viewport 314. The live object display can include video and audio played in real time. In some cases the first frame of a video advertisement is the first frame of the video clip. In other cases the first frame of a video advertisement is a key frame (which may or may not be included in the remainder of the video clip). Also shown is a control panel 320, which includes display tabs 322 and a plurality of buttons 324 with or without pull-down menus.

Now, having an ad campaign (whether defined using the aforementioned tools or any other method), it can be comprehended that various tools can be augmented so as to facilitate composition of an advertisement (see FIG. 2A and FIG. 2B), including user-directed facilities for adding instrumentation pertinent to measuring the effects of social sharing on online content and advertising (see FIG. 3).

For measuring the effects of social sharing on online content and advertising, various embodiments of the object cockpit 300 provide screen devices (e.g. buttons, pull-down menus, text fields, checkboxes, etc). More particularly, the object cockpit 300 includes screen devices for including ad sharing and instrumentation code 170 into the ad or into the publisher's web page; thus, the ad sharing and instrumentation code automatically instruments the sharing behavior to track both pre-sharing activities as well as the post-sharing activities.

In exemplary embodiments, the ad sharing and instrumentation code, when incorporated into an ad or page, serves to:
1. Measure sharing by each element in the ad.
2. Track the total number of measured sharing activities.
3. Track activities with specific characteristics to facilitate reporting of a categorization of sharing activity by social network. For example, the ad sharing and instrumentation code can measure how many users shared the ads from a particular social networking website or application (e.g. by using Yahoo!, Facebook, Twitter, email, etc). Such measurements can then be used to determine which social networks or applications appeal most to users and/or what ordering of social networking icons returns the most desired results, etc.
4. Measure drop of rate along each step in the sharing process. Such measurements might serve to streamline the process of sharing. For example, if sharing at a specific network requires a user to explicitly logon into the network, this may discourage users from sharing and the sharing activity may significantly drop. This data might serve to provide feedback for the publisher and the social network to allow the sharing of common user credentials. Or, such feedback might serve to reduce or eliminate reliance on a common set of users between the publisher and the social network.

The object cockpit 300 includes screen devices for including ad sharing and instrumentation code 170 into the ad or into the publisher's page. In particular, the object cockpit 300 includes a social-share tagging device 330. As shown, the social-share tagging device 330 supports user selection of one or more combinations of characteristics of the ad sharing and instrumentation code for instrumenting the sharing behavior for tracking both pre-sharing activities as well as post-sharing activities. Post-sharing activity includes user behavior during or after the advertisement has been displayed, for example, during or after a user visits a social networking website. As an example, the advertisement can be displayed within a social networking site page.

Figure 4A:
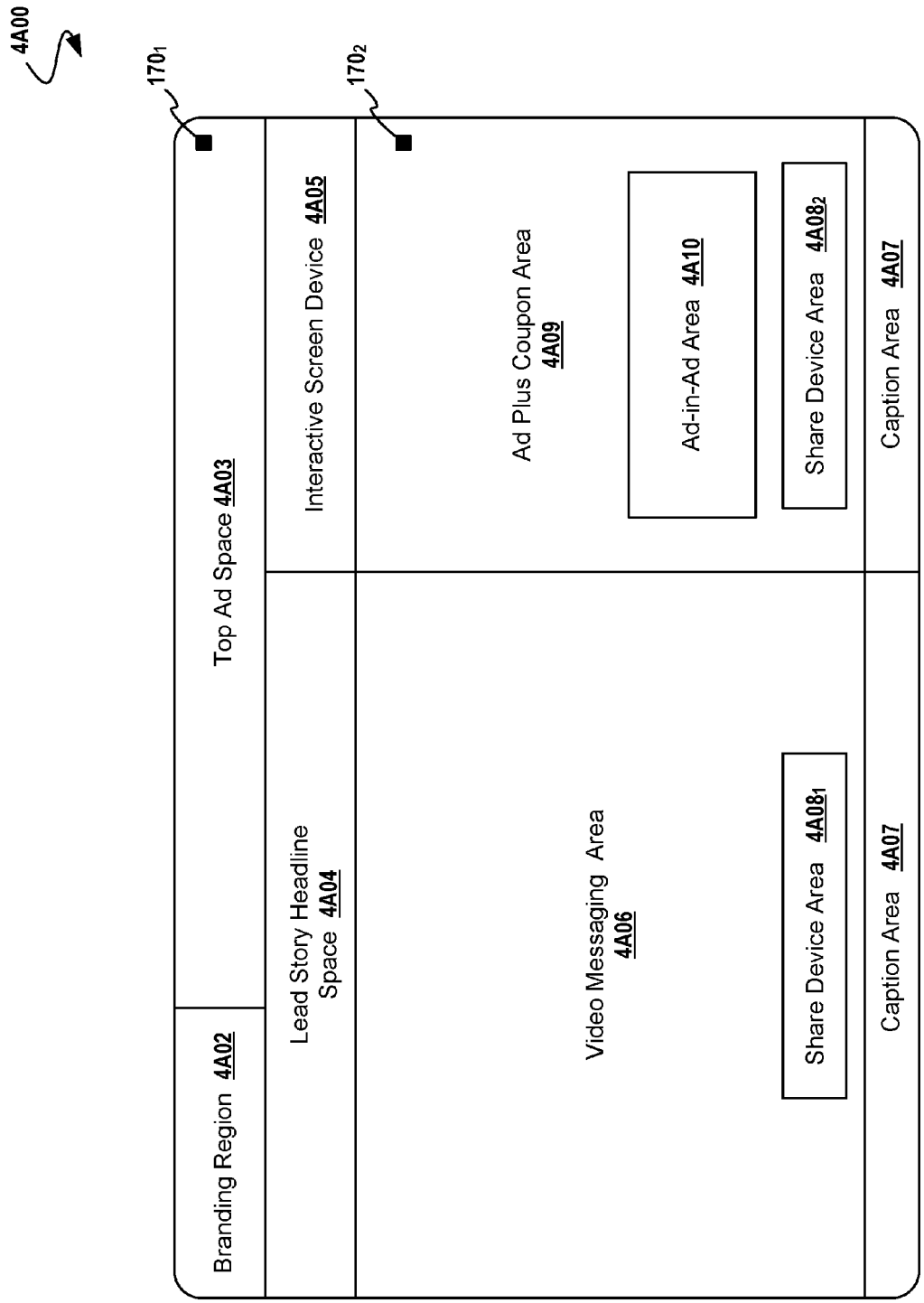
FIG. 4A depicts a social networking web page showing a plurality of regions for constituent components of a social networking web page, according to an exemplary embodiment.

FIG. 4A depicts a social networking web page 4A00 showing a plurality of regions for constituent components of a social networking web page. As shown, the social networking web page 4A00 comprises a branding region 4A02, possibly for display of a branding logo or message; a top ad space 4A03, possibly for display of a banner ad; a lead story headline space 4A04; and an interactive screen device 4A05. Also depicted is a video messaging area 4A06, caption area(s) 4A07, share device area(s) 4A08, and an ad plus coupon area 4A09. The ad plus coupon area 4A09 includes an an-in-ad area 4A10. Of course any ad may contain an ad-in-ad area and, recursively, any ad-in-ad area may contain a further ad-in-ad area. Moreover, a particular ad may be sponsored or placed by an agent or aggregator, and such an ad might involve one or more sub-advertisers. For example, an ad placed by an aggregator (e.g. the chamber of commerce of Anytown, USA) might promote tourism by offering suggestions of locations for fine dining. The aggregator might then follow some promotion rules and place, within the aggregator's tourism ad, further ads in the form of an ad-in-ad area. In such an example, the ad-in-ad materials might be provided by the advertiser or by the advertiser's agency (e.g. on an advertisement serving module 113), or by any other party in the internet ad ecosystem for that matter.

Thus, it becomes apparent that the display of a social networking web page might involve multiple network calls in succession in order to retrieve all components for composition and display on the user's client system display device. Furthermore, any ad (e.g. a top ad space 4A03, and/or an ad-in-ad area 4A10) might contain one or more instances of ad sharing and instrumentation code 170. As shown, the top ad space 4A03 contains an instance of ad sharing $170_1$, and the ad plus coupon area 4A09 also contains an instance of ad sharing $170_2$.

Figure 4B:
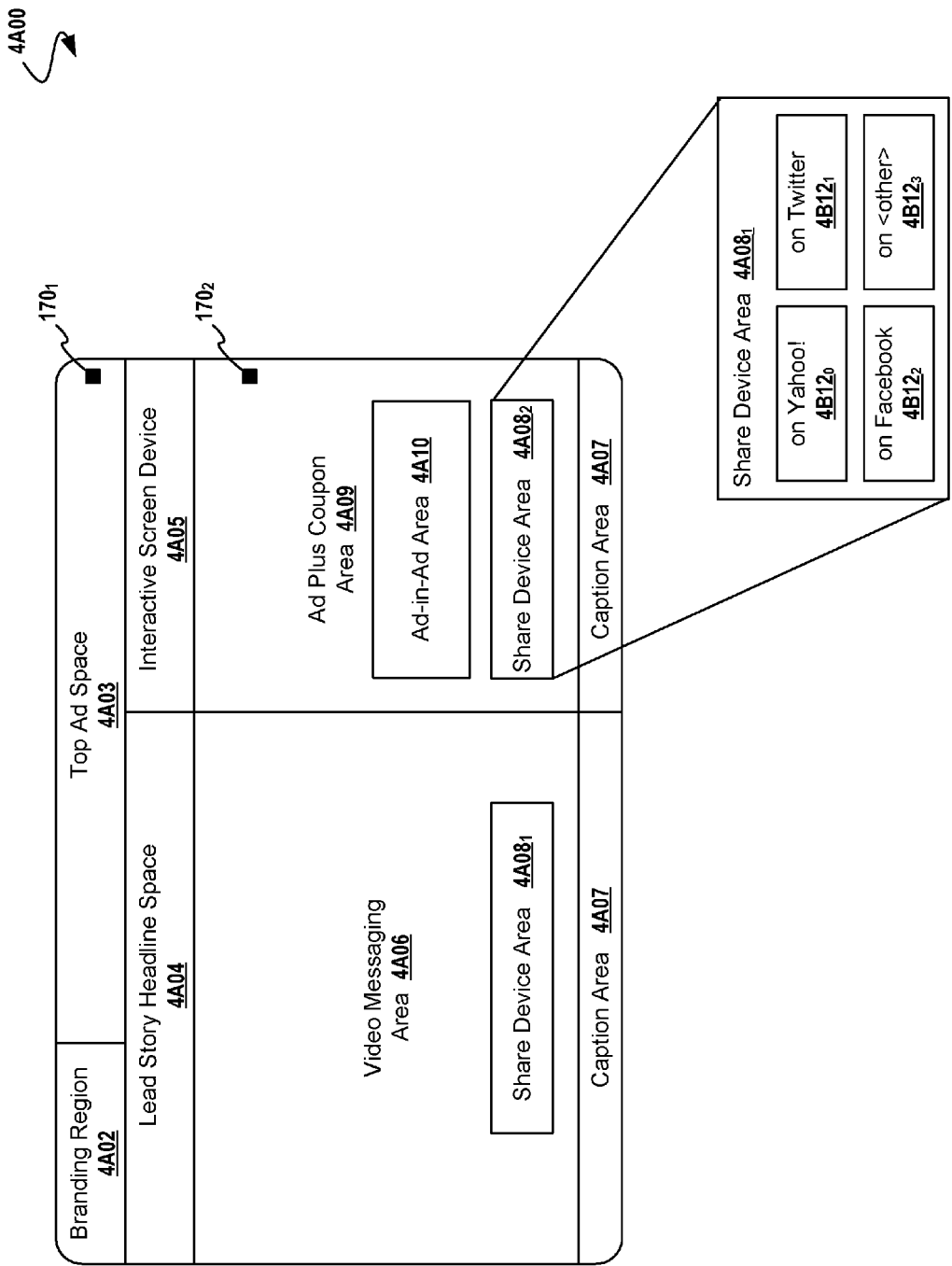
FIG. 4B depicts a social networking web page showing an enlargement of an area for a share device area, according to an exemplary embodiment.

FIG. 4B depicts a social networking web page showing an enlargement of an area for a share device area. As shown, the social networking web page 4A00 contains a share device area 4A08. Within a share device area 4A08, one or more share icons 4B12 can be displayed. For example, the share device area $4A08_2$ can contain a Yahoo! website share icon $4B12_0$, a Twitter website share icon $4B12_1$, a Facebook website share icon $4B12_2$, and/or any other sharing website icon $4B12_3$, etc.

Now, as earlier indicated, a module within an online advertising system 100 (e.g. a sharing activity processing module 117 within an online advertising system) can track activities with specific characteristics to facilitate reporting of a categorization of sharing activity by the social network. As can now be understood, the presence and activation of ad sharing and instrumentation code 170 within an ad (e.g. within or associated with a share device area 4A08) can capture the online event of a user sharing an ad (e.g. by using a share icon 4B12). Thus, after capturing measurements resulting from the user sharing activity (e.g. using a sharing activity processing module 117) a sharing activity reporting module 118 within an online advertising system can report a categorization of sharing activity by the social network or networks selected by the user. These measurements can then be used to determine which social networks appeal most to which users, what ordering of social networking icons works the best, etc. In addition, capturing measurements resulting from the user sharing activity during post-sharing activities can also be measured and reported.

Measurement of Post-Sharing Activity

In the context of sharing within (or between) social networking websites, examples of measurements of post-sharing activities include, without limitation, measurements of any online events that occur after a particular ad has been shared. From such measurements, specific marketing information can be provided to the advertiser or advertiser's agent such as:

1. Measuring sharers: An important aspect to be gleaned from social sharing is to measure which users are typically more likely to share. This can be done by capturing demographic information in the user's bcookie/lcookie, thus allowing the publisher and ad network to recognize users within certain demographics, and to then value these users higher when presenting them with sharing options.
2. Measuring influencers in the sharing path: By capturing demographic information from the user's bcookie or lcookie (possibly using a URL encoded crumb) the sharing activity processing module 117 can measure how much of the post-click activity each user (and subsequently their friends and friend's friends, and so on) generates. At least since the shared ad (e.g. a recoded sharable internet ad 160) comprises ad sharing and instrumentation code 170, this measurement does not require explicit data sharing or explicit support from the social networks. Thus, using this technique in combination with other techniques disclosed herein allows measuring influencers in the sharing path, irrespective of the social network.

In some embodiments, a click beacon may be provided, the beacon including the user-specific crumb in it. This crumb can be anonymized to remove any personally identifiable information, and otherwise address any privacy concerns. Thus, using these techniques, the disclosed methods and systems for measuring the effects of social sharing on online content and advertising serves for:

1. Measurement of sharing activity for both advertisements and content.
2. Providing sharing activity reports to advertisers and publishers in order to determine which sharing networks to include in an ad/page by measuring which sharing networks their users use the most.
3. Providing sharing activity reports to advertisers, publishers, and advertising network providers to measure the post-click activity, including determination of which social networks generate the most post-click activity.
4. Measurement of effectiveness sharing of each element within the ad/page.
5. Providing sharing activity reports to advertiser networks and publisher networks to determine sharers and influencers on their respective networks.

Some embodiments support sharing of a coupon, which coupon may be incorporated into a sharable ad.

Figure 5A:
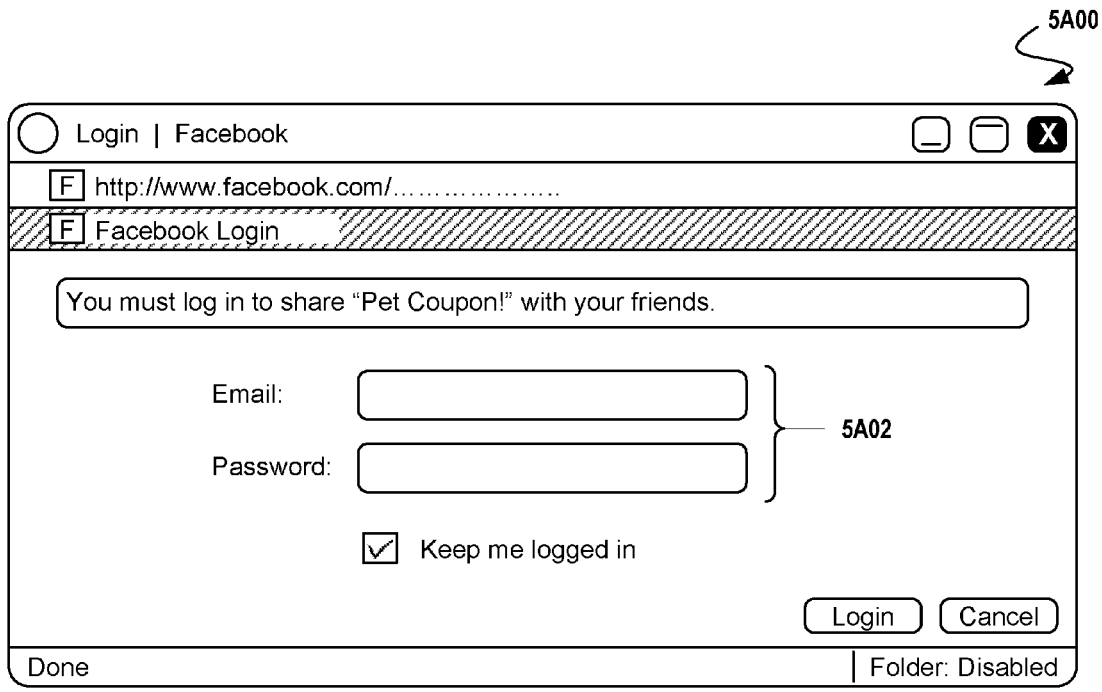
FIG. 5A depicts an ad plus coupon sharing area within a social networking web page, according to an exemplary embodiment.

FIG. 5A depicts an ad plus coupon sharing area within a social networking web page. The sharing area 5A00 includes an invitation for the user to logon 5A02 into one or more social networking websites (e.g. Facebook, as shown).

Figure 5B:
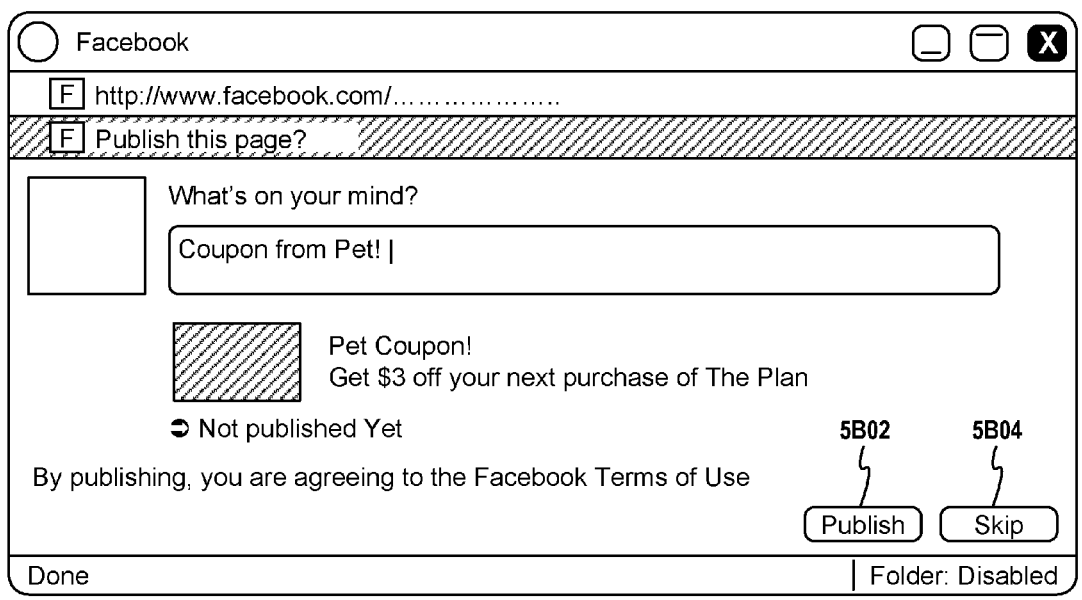
FIG. 5B depicts an ad plus coupon sharing area for user annotation, according to an exemplary embodiment.

FIG. 5B depicts an ad plus coupon sharing area for user annotation. The sharing area 5B00 includes an area (e.g. a text box, as shown) for the user to add a comment to the shared coupon. The user can add such an annotation, and then decide to publish (see the "Publish" button 5B02) or skip (see the "Skip" button 5B04) the annotation option.

As can be understood from the foregoing discussions of sharing options, a single action of sharing may result in further cascaded acts of sharing. To facilitate a cascade of sharing, various screen devices may be employed.

Figure 6A:
FIG. 6A depicts a sharable ad plus a shared comment provided by an earlier sharer, according to an exemplary embodiment.

FIG. 6A depicts a sharable ad plus a shared comment provided by an earlier sharer (e.g. as is depicted in FIG. 5B and described in the corresponding description). As shown, the sharable ad plus a comment provided by an earlier sharer 6A00 may include a rich media ad area 6A10, a first element of shared content 6A20, and a second element of shared content 6A30. The user activity (e.g. clicking sharing) may be captured as pertaining to any element (e.g. a click on a first element of shared content 6A20 and/or a click on a second element of shared content 6A30). The contents of a rich media ad area 6A10 can include a video clip, a video clip with audio, a video clip with user controls, etc.

Figure 6B:
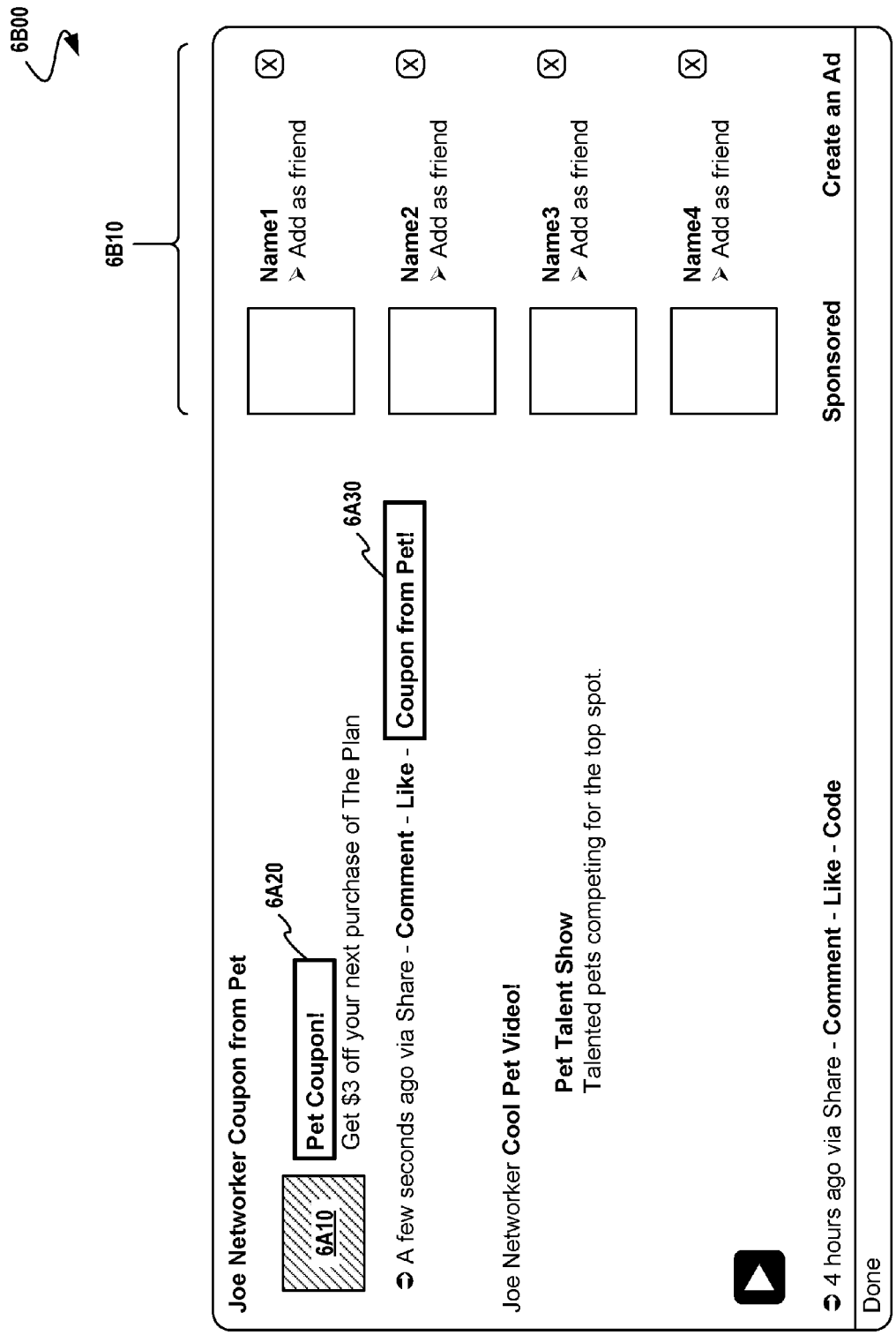
FIG. 6B depicts a display area with a cascaded sharing area, according to an exemplary embodiment.

FIG. 6B depicts a display area 6B00 with a cascaded sharing area 6B10. As shown, the display area 6B00 may include a rich media ad area 6A10, a first element of shared content 6A20, and a second element of shared content 6A30. The cascaded sharing area 6B10 includes suggestions for further sharing. For example, the cascaded sharing area 6B10 can include suggestions of names of users with whom to share.

Thus, using the techniques described herein (e.g. beacons, crumbs, etc), the extent of the cascade of sharing can be measured. Conversely, application of techniques described herein can also measure drop rates along each step in the sharing process. Such measurements of drop rates can facilitate improvements to the process of sharing. For example, if sharing to a specific network requires a user to explicitly logon into that network, then this may discourage that user from sharing and the subsequent sharing activity may drop significantly.

Additional Detailed Measurement of Sharing Activity

Some embodiments track clicks on each element of the shared content/ad separately via the use of a post-sharing click redirect mechanism. Many additional tracking mechanisms are possible and envisioned. For example, Table 1 shows several possibilities of tracking activities (e.g. using a tracking beacon) arranged into classification buckets.

TABLE 1

Classification Buckets

| Classification Bucket # | Description |
| --- | --- |
| 1 (Control Bucket) | Video and coupon but no sharing |
| 2 | Video sharing only |
| 3 | Coupon sharing only |
| 4 | Video and coupon sharing |
| 5 | Coupon sharing but no video |

Control Bucket—Measurements captured include (but are not limited to) the following:
1. Aggregate impressions/clicks
2. Engagement time, interaction rate, average time spent
3. Video plays and completion rate
4. Disaggregated click-through rate numbers, including clicks on the coupon section All Other Buckets—Measurements captured include (but are not limited to) the following pre-sharing and metrics post-sharing metrics:

Pre-Sharing Metrics
All metrics reported for the control bucket
Sharing of video and/or coupons, wherever the sharing is enabled
Number of shares for each mechanism (e.g. share via Facebook icon, share via email, share with comment, etc)
Sharing abandonment
Post-Sharing Metrics
Click-backs on each of the shared elements
Inline video plays and completions
Clicks on coupons
Coupon print activity (e.g. conversion tracking)

Use of GUID

As indicated above, a tracking beacon for capturing pre-sharing and post-sharing activities can carry an impression object (e.g. a data structure) populated with user and activity information, including a time stamp.

Figure 7:
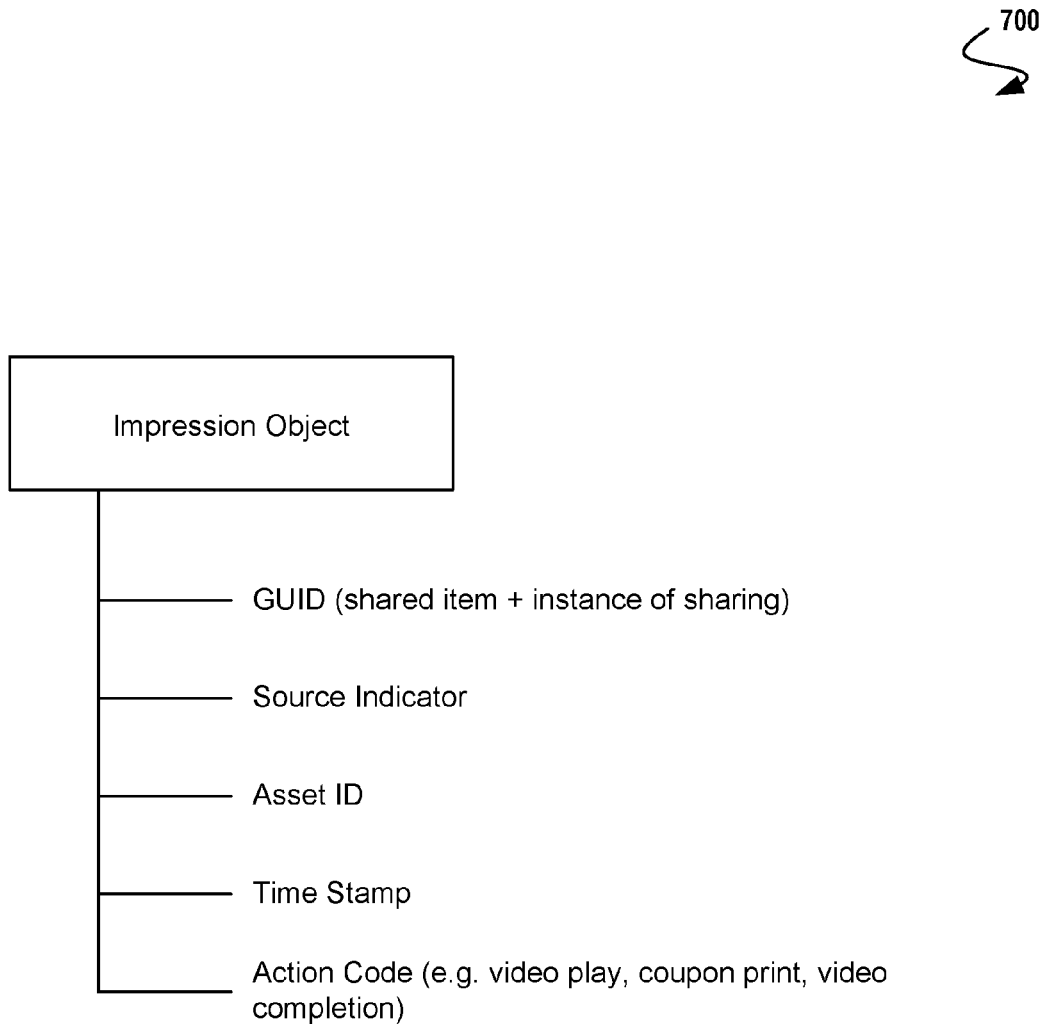
FIG. 7 depicts an impression object for capturing pre-sharing and post-sharing activities, according to an exemplary embodiment.

FIG. 7 depicts an impression object for capturing pre-sharing and post-sharing activities. As shown, an impression object 700 can comprise fields for storing a global user identification (GUID), a source indicator, an asset identifier, a time stamp, and an action code. An impression object 700 as may be populated with one or more of the aforementioned fields, and a sharing activity processing module 117, and/or a sharing activity reporting module 118, may use any one or more of the populated fields for gathering and reporting information regarding pre- and post-sharing activities.

Furthermore, using such an impression object, possibly in combination with a beacon as earlier described, it is possible to measure and track activities. Moreover, such a technique does not rely on the API of the social networking website, thus offering flexibility for large-scale, rapid deployment.

As further examples of activities to be measured (e.g. online events), Table 2 presents measured online events and descriptions of same.

TABLE 2

Measured Online Events

| Online Event Name | Description |
| --- | --- |
| Expand_Ad | User initiated expand of an advertisement; also captures rich media screen device interaction (e.g. clicks, hover over, etc) |
| Share_Click | Captures attributes of the element the user wants to share |
| Share_Networks | Captures which sharing network(s) the user clicks on (i.e. which share icons) |
| Share_Peaks | Captures the drop-off rate after local peaks |
| Print_Coupon | Captures a print coupon action |
| Conversion_Action | Captures use of a coupon in a commercial transaction |

Some of the aforementioned techniques can be applied in a network-independent manner. Additionally, a particular social network can provide intra-network facilities that augment common, network-independent capabilities. Strictly as an exemplary set, Facebook provides online events specific to various shared items (e.g. a page title, an image, a link, a video title, etc), and such online events can be carried in an impression object. Table 3 presents such measured online events and descriptions of same.

TABLE 3

Intra-Network Actions

| Online Event Name | Description |
| --- | --- |
| Title_Click | Click on a title of an intra-network shared coupon |
| Img_Click | Image thumbnail click on an intra-network shared coupon |
| Link_Click | Link click on an intra-network shared coupon |

TABLE 3-continued

Intra-Network Actions

| Online Event Name | Description |
|---|---|
| Video_Click | Click on an intra-network shared video |
| Video_Interact | Inline video interaction (e.g. game play, re-play, etc) |

It can be understood that the aforementioned techniques can be applied to advantageously perform operations for measuring the effects of social sharing on online content and advertising. Further, in one embodiment, a computer-implemented method for measuring ad performance metrics after user-initiated sharing activity at a social networking website can commence upon receiving an original internet ad (i.e. the original internet ad for hosting within a social networking website), followed by recoding the original internet ad in order to produce a recoded sharable internet ad (which recoded sharable internet ad may use any of a range of heretofore disclosed screen devices). The recoded internet ad comprises ad sharing and instrumentation code for measuring any of a wide range of online events. More particularly, for measuring the effects of social sharing on online content and advertising, any of the range of online events are in response to the user-initiated sharing activity—or in response to a second user-initiated activity and so on in a cascade of events triggering other events.

Again, for measuring the effects of social sharing on online content and advertising, any one or more modules (e.g. sharing activity reporting module 118) can serve for reporting a categorization of sharing activity. In fact, the online events and any categorization of sharing activity can include results of tracking an expand_ad event, a share_click event, a share_networks event, a print_coupon event, and/or a conversion_action event (see Table 2). Indeed user-initiated sharing activity may be stimulated by effective, eye-catching advertisements, possibly including ads comprising a video clip, a video clip with audio, a video clip with user controls, etc. In some cases an advertisement may include a coupon, and the coupon (as well as any other portion of the ad) may be shared. For ease of adoption (e.g. by advertisers), tools can be provided and possibly integrated into pre-existing publisher/advertiser tools. In some cases a tool includes an object cockpit, and the recoding of the ad (for sharing) is performed using an object cockpit for computer-aided incorporation of the instrumentation code into the original internet ad.

Figure 8:
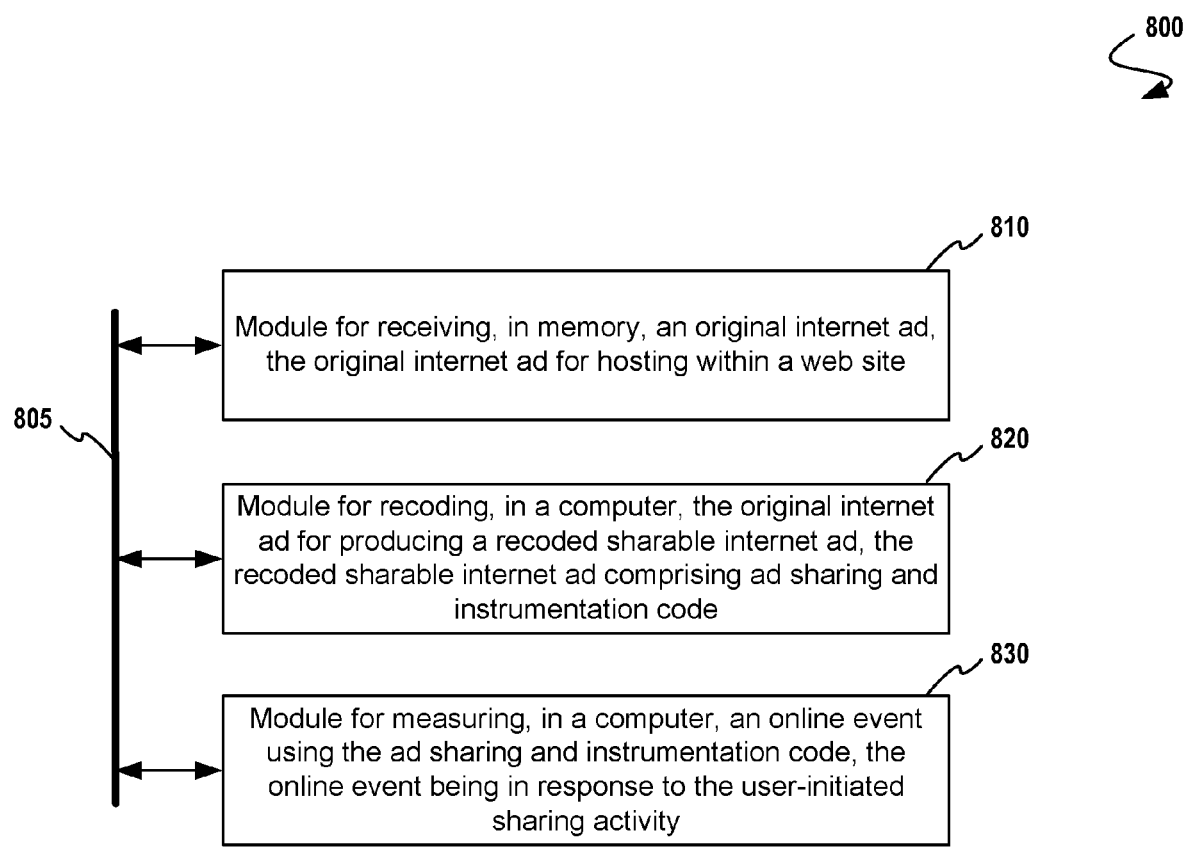
FIG. 8 depicts a block diagram of a system for measuring ad performance metrics after user-initiated sharing activity at a social networking website, according to an exemplary embodiment.

FIG. 8 depicts a block diagram of a system for measuring ad performance metrics after user-initiated sharing activity at a social networking website. As an option, the present system 800 may be implemented in the context of the architecture and functionality of the embodiments described herein. Of course, however, the system 800 or any operation therein may be carried out in any desired environment. As shown, system 800 includes a plurality of modules, each connected to a communication link 805, and any module can communicate with other modules over communication link 805. The modules of the system can, individually or in combination, perform method steps within system 800. Any method steps performed within system 800 may be performed in any order unless as may be specified in the claims. As shown, system 800 implements a method for measuring ad performance metrics after user-initiated sharing activity at a social networking website, the system 800 comprising modules for: receiving, in memory, an original internet ad, the original internet ad for hosting within a social networking website (see module 810); recoding, in a computer, the original internet ad for producing a recoded sharable internet ad, the recoded sharable internet ad comprising ad sharing and instrumentation code (see module 820); and measuring, in a computer, an online event using the ad sharing and instrumentation code, the online event being in response to the user-initiated sharing activity (see module 830).

Figure 9:
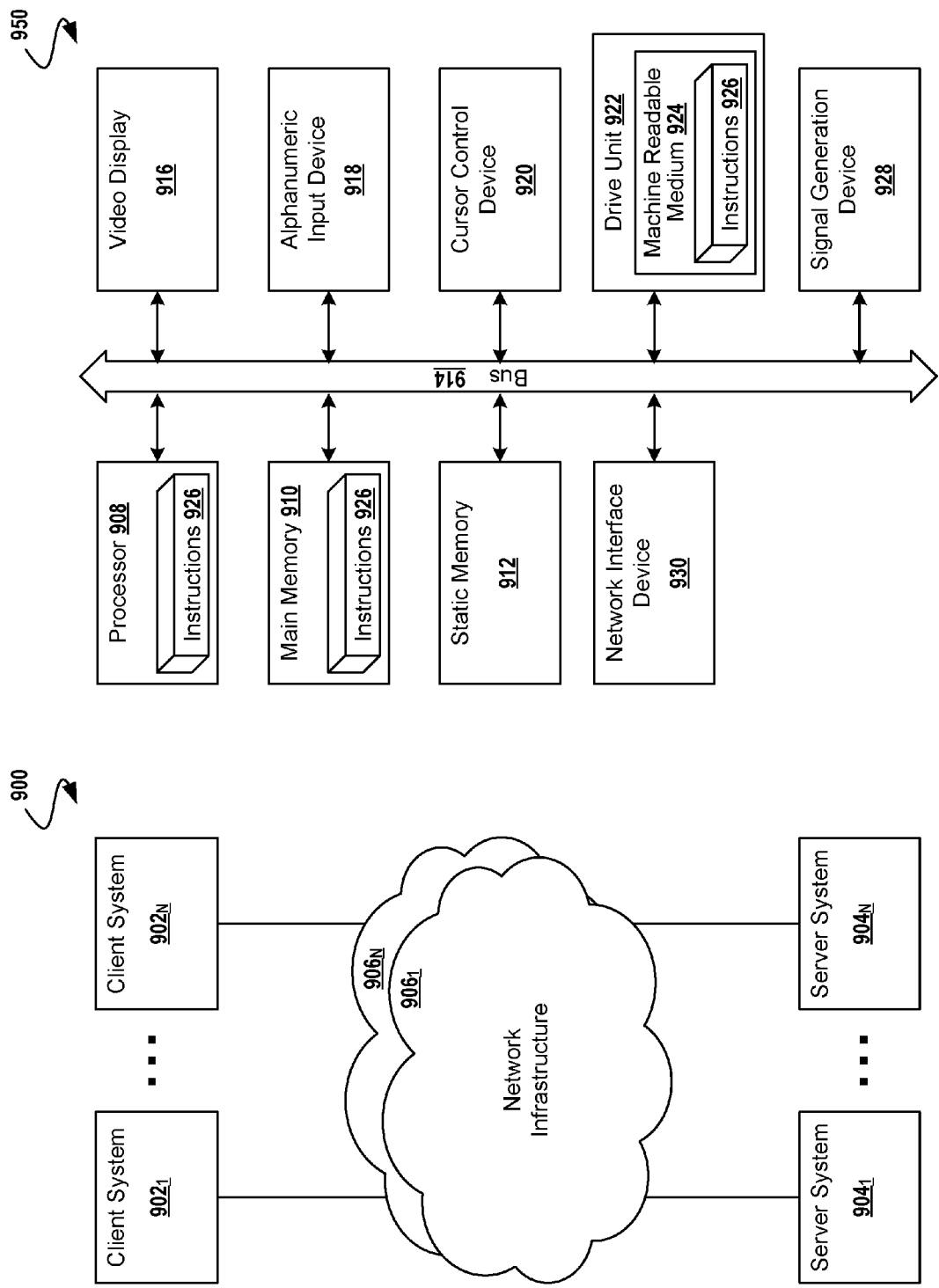
FIG. 9 depicts a diagrammatic representation of a network including nodes for client computer systems, nodes for server computer systems and nodes for network infrastructure, according to one embodiment.

FIG. 9 is a diagrammatic representation of a network 900, including nodes for client computer systems $902_1$ through $902_N$, nodes for server computer systems $904_1$ through $904_N$, and nodes for network infrastructure $906_1$ through $906_N$, any of which nodes may comprise a machine (e.g. computer 950) within which a set of instructions for causing the machine to perform any one of the techniques discussed above may be executed. The embodiment shown is purely exemplary, and might be implemented in the context of one or more of the figures herein.

Any node of the network 900 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 950) includes a processor 908 (e.g. a processor core, a microprocessor, a computing device, etc), a main memory (e.g. computer memory 910), and a static memory 912, which communicate with each other via a bus 914. The computer 950 may further include a display unit (e.g. computer display 916) that may comprise a touch-screen, or a liquid crystal display (LCD), or a light emitting diode (LED) display, or a cathode ray tube (CRT). As shown, the computer system also includes a human input/output (I/O) device 918 (e.g. a keyboard, an alphanumeric keypad, etc), a pointing device 920 (e.g. a mouse, a touch screen, etc), a drive unit 922 (e.g. a disk drive unit, a CD/DVD drive, a tangible computer readable removable media drive, an SSD storage device, etc), a signal generation device 928 (e.g. a speaker, an audio output, etc), and a network interface device 930 (e.g. an Ethernet interface, a wired network interface, a wireless network interface, a propagated signal interface, etc). The drive unit 922 includes a machine-readable medium 924 on which is stored a set of instructions (i.e. software, firmware, middleware, etc) 926 embodying any one, or all, of the methodologies described above. The set of instructions 926 is also shown to reside, completely or at least partially, within the main memory and/or within the processor 908. The set of instructions 926 may further be transmitted or received via the network interface device 930 over the network bus 914.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting non-transitory information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing non-transitory information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for measuring ad performance metrics after a first user-initiated sharing activity, the method comprising:
    receiving, in memory, an original internet ad;
    recoding, in a computer, the original internet ad to produce a recoded sharable internet ad, the recoded sharable internet ad comprising instrumentation code to transmit one or more aspects of sharing of the recoded sharable internet ad among one or more users to a server;
    measuring, using at least the instrumentation code, one or more aspects of a first online event that corresponds to a first user sharing of a first instance of the recoded sharable internet ad with a second user; and
    measuring, using at least the instrumentation code, a post-sharing activity that corresponds to an action taken by the second user, the action responsive to the first user sharing of the recoded sharable internet ad, the measuring a post-sharing activity including determining a drop of a rate of sharing to one or more network locations in different specific networks along one or more steps in a sharing process subsequent to the post-sharing activity, and determining, without social network data sharing, an amount of additional post-sharing activities that correspond to actions taken by one or more other users and that are generated at least indirectly as a result of the post-sharing activity.

2. The computer-implemented method of claim 1, wherein the action taken by the second user is a post-sharing activity to share a second instance of the recoded sharable internet ad with a third user.

3. The computer-implemented method of claim 1, wherein the first online event comprises at least one of an expand_ad event, a share_click event, a share_networks event, a print_coupon event, and a conversion_action event.

4. The computer-implemented method of claim 1, wherein the original internet ad comprises at least one of a video clip, a video clip with audio, and a video clip with user controls.

5. The computer-implemented method of claim 1, wherein the original internet ad comprises a coupon.

6. The computer-implemented method of claim 1, wherein the recoded sharable internet ad comprises at least one of a social sharing screen device area, a share icon, video clip, a video clip with audio, a video clip with user controls, a click beacon, and a crumb.

7. The computer-implemented method of claim 1, wherein the recoding is performed using an object cockpit.

8. An advertising system comprising at least one computer that comprises at least one processor and memory for measuring ad performance metrics after a first user-initiated sharing activity by:
    receiving an original internet ad;
    recoding the original internet ad to produce a recoded sharable internet ad, the recoded sharable internet ad comprising instrumentation code to transmit one or more aspects of sharing of the recoded sharable internet ad among one or more users to a server;
    measuring, using at least the instrumentation code, one or more aspects of a first online event that corresponds to a first user sharing of a first instance of the recoded sharable internet ad with a second user; and
    measuring, using at least the instrumentation code, a post-sharing activity that corresponds to an action taken by the second user, the action responsive to the first user sharing of the recoded sharable internet ad, the measuring a post-sharing activity including determining a drop of a rate of sharing to one or more network locations in different specific networks along one or more steps in a sharing process subsequent to the post-sharing activity, and determining, without social network data sharing, an amount of additional post-sharing activities that correspond to actions taken by one or more other users and that are generated at least indirectly as a result of the post-sharing activity.

9. The advertising system of claim 8, wherein the receiving computer and the recoding computer are implemented in a first computer and the measuring computer is implemented in a second computer comprising a module for reporting a categorization of sharing activity to share a second instance of the recoded sharable internet ad with a third user.

10. The advertising system of claim 8, wherein the first online event comprises at least one of an expand_ad event, a share_click event, a share_networks event, a print_coupon event, and a conversion_action event.

11. The advertising system of claim 8, wherein the original internet ad comprises at least one of a video clip, a video clip with audio, and a video clip with user controls.

12. The advertising system of claim 8, wherein the original internet ad comprises a coupon.

13. The advertising system of claim 8, wherein the recoded sharable internet ad comprises at least one of a social sharing screen device area, a share icon, video clip, a video clip with audio, a video clip with user controls, a click beacon, and a crumb.

14. The advertising system of claim 8, wherein the recoding is performed using an object cockpit.

15. A non-transitory computer readable medium comprising a set of instructions which, when executed by a computer, cause the computer to measure ad performance metrics after a first user-initiated sharing activity, said instructions for:
    receiving, in memory, an original internet ad;
    recoding, in a computer, the original internet ad to produce a recoded sharable internet ad, the recoded sharable internet ad comprising instrumentation code to transmit one or more aspects of sharing of the recoded sharable internet ad among one or more users to a server;
    measuring, using at least the instrumentation code, one or more aspects of a first online event that corresponds to a first user sharing of a first instance of the recoded sharable internet ad with a second user; and measuring, using at least the instrumentation code, a post-sharing activity that corresponds to an action taken by the second user, the action responsive to the first user sharing of the recoded sharable internet ad, the measuring a post-sharing activity including determining a drop of a rate of sharing to one or more network locations in different specific networks along one or more steps in a sharing process subsequent to the post-sharing activity, and determining, without social network data sharing, an amount of additional post-sharing activities that correspond to actions taken by one or more other users and that are generated at least indirectly as a result of the post-sharing activity.

16. The non-transitory computer readable medium of claim 15, wherein the action taken by the second user is a post-sharing activity to share a second instance of the recoded sharable internet ad with a third user.

17. The non-transitory computer readable medium of claim 15, wherein the first online event comprises at least one of an expand_ad event, a share_click event, a share_networks event, a print_coupon event, and a conversion_action event.

18. The non-transitory computer readable medium of claim 15, wherein the original internet ad comprises at least one of a video clip, a video clip with audio, and a video clip with user controls.

19. The non-transitory computer readable medium of claim 15, wherein the original internet ad comprises a coupon.

20. The non-transitory computer readable medium of claim 15, wherein the recoded sharable internet ad comprises at least one of a social sharing screen device area, a share icon, video clip, a video clip with audio, a video clip with user controls, a click beacon, and a crumb.

21. The method of claim 1, further comprising measuring effects of the post-sharing activity.

22. The method of claim 21, wherein the effects of the post-sharing activity includes a drop rate of sharing.

23. The method of claim 21 wherein the effects of the post-sharing activity includes click-backs corresponding to shared elements.

24. The method of claim 21 wherein the effects of the post-sharing activity includes at least one of inline video plays, inline video plays completions, clicks on coupons, or coupon print activity.

25. The method of claim 1 wherein the instrumentation code serves to measure post-sharing clicks using a post-sharing click redirect mechanism.

* * * * *